Aug. 21, 1956  E. L. CARPENTER  2,759,604
ELECTRO-MAGNETIC ROAD CLEANER
Filed March 2, 1955  3 Sheets-Sheet 1

INVENTOR
ERNEST L. CARPENTER
BY Justus Miller
ATTORNEY

Aug. 21, 1956
E. L. CARPENTER
2,759,604
ELECTRO-MAGNETIC ROAD CLEANER
Filed March 2, 1955
3 Sheets-Sheet 2
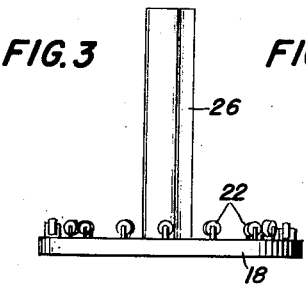
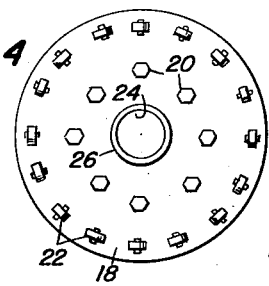
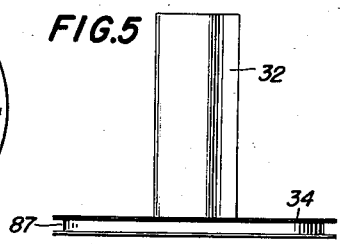
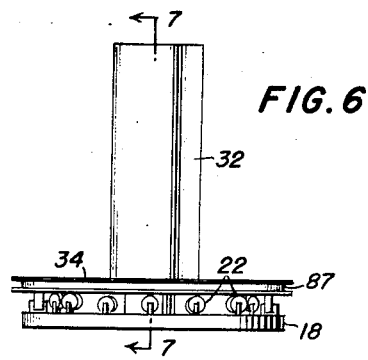
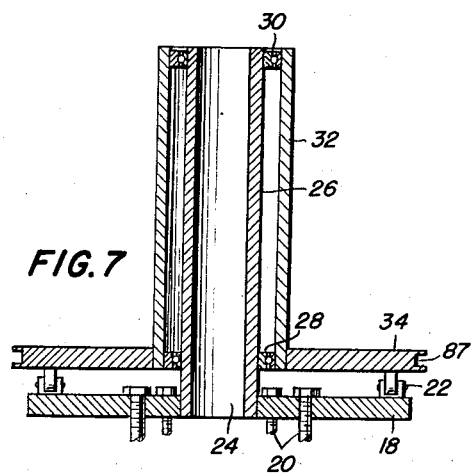
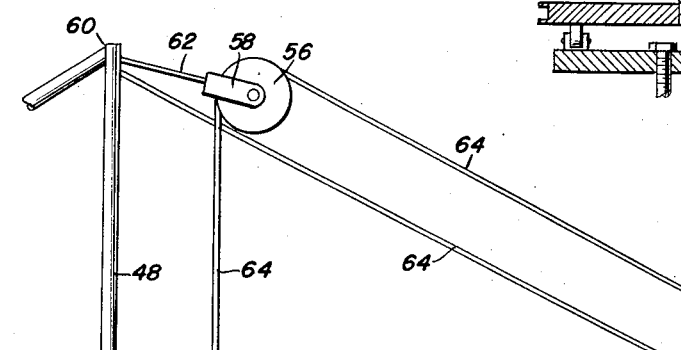
INVENTOR
ERNEST L. CARPENTER
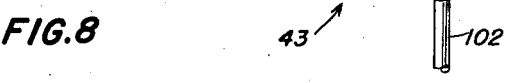
ATTORNEY Aug. 21, 1956          E. L. CARPENTER                2,759,604
              ELECTRO-MAGNETIC ROAD CLEANER
Filed March 2, 1955                              3 Sheets-Sheet 3
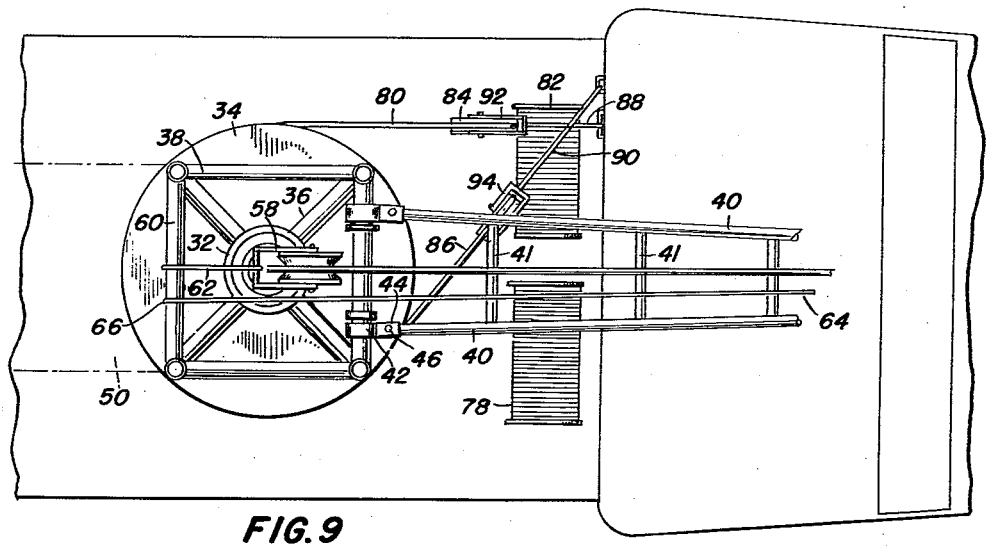
FIG. 9
FIG. 10
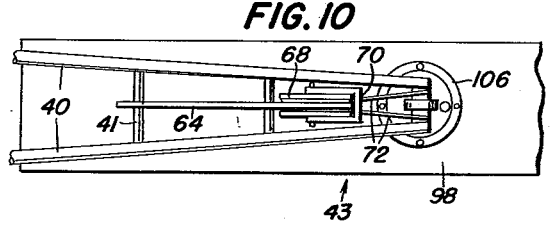
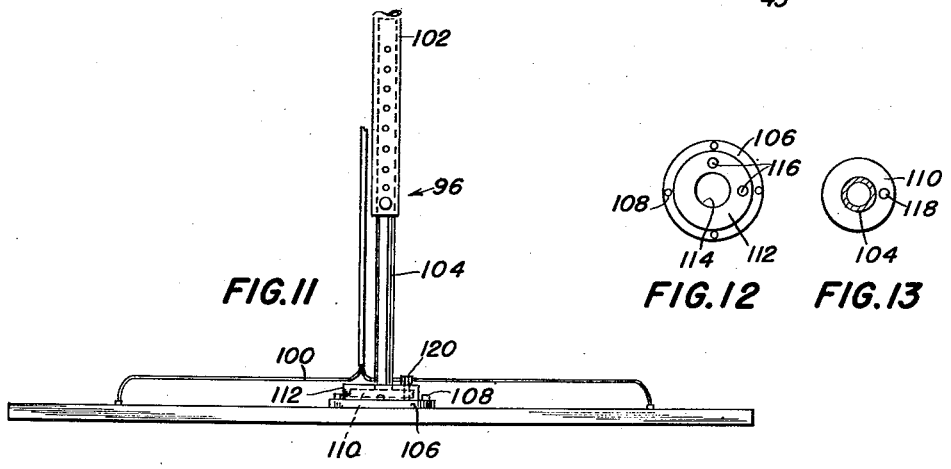
FIG. 11
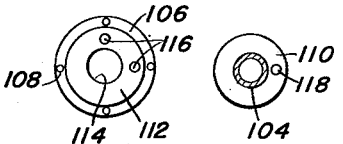
FIG. 12      FIG. 13
INVENTOR
ERNEST L. CARPENTER
BY Gustave Miller
ATTORNEY

United States Patent Office 2,759,604
Patented Aug. 21, 1956

2,759,604

ELECTRO-MAGNETIC ROAD CLEANER

Ernest L. Carpenter, Comanche, Tex.

Application March 2, 1955, Serial No. 491,626

4 Claims. (Cl. 209—215)

This invention relates to a pick-up device for picking up nails, tin cans, bolts, small pieces of scrap metal and other metallic articles littering a road or highway and liable to cause tire punctures or other damage to automobile tires and the like. In particular, this invention relates to a pick-up device of the magnetic type.

Magnetic-type pick-up devices for clearing roads of metallic refuse have been before this. However, these previous devices, generally mounted on trucks or other vehicles, have, in general, comprised one or more magnets or electro-magnets dangling from chains which were adapted to lift the magnets up, when not in use, and to lower them into positions adjacent the ground when in use. However, these chain-manipulated magnets could not be easily handled or adjusted since the inherent flexibility of the chains permitted only the vertical adjustment of the magnets either with or against the force of gravity. Furthermore, the chains were often apt to break, especially under the sudden increase in weight when large or numerous articles were attracted to the magnet. In addition, the chains often dragged and fouled the wheels of the vehicle causing damage to the vehicle and possible injury to the operating personnel.

Another great disadvantage of these prior devices was the fact that the magnets could only follow the path of the vehicle so that if debris were on the side of the road, out of the path of the vehicle, it was necessary to drive the vehicle in that direction. This was often impossible or dangerous because of the presence of soft shoulders or rocks on the side of the road. Sometimes, the debris was so close to the side of the road that it was impossible to drive the vehicle close enough to bring the magnets into position. On the whole, these previous devices were generally clumsy, complex, dangerous and difficult to handle and adjust, and wholly inadequate for the purposes intended. It is, therefore, one object of the present invention to provide a pick-up device of the magnetic type wherein the magnet is rigidly attached to a controlling arm which can be adjusted in a generally universal direction.

Another object of the present invention is to provide a pick-up device of the magnetic type which is capable of picking up articles on all parts of the road easily and quickly.

Another object of the present invention is to provide a pick-up device of the magnet type which is not easily damaged and which is easy to manipulate and adjust.

Other objects of the present invention are to provide an improved pick-up device, of the character described, that is easily and economically produced, which is sturdy in construction, and which is highly efficient in operation.

With the above and related objects in view, this invention consists in the details of construction and combination of parts as will be more fully understood from the following description, when read in conjunction with the accompanying drawings in which:

Fig. 3 is a side elevational view of the base used to rotatably support the magnet-carrying boom.

Fig. 4 is a top plan view of the structure shown in Fig. 3.

Fig. 5 is a side elevational view of the boom-supporting structure.

Fig. 6 is a side elevational view showing the boom-supporting structure of Fig. 5 mounted on the base of Fig. 3.

Fig. 7 is an enlarged cross-sectional view taken on line 7—7 of Fig. 6.

Fig. 8 is a fragmentary side elevational view of the boom structure as mounted on the base.

Fig. 9 is a fragmentary top plan view of the boom structure mounted on the truck.

Fig. 10 is a fragmentary top plan view of the boom structure omitted from Fig. 9.

Fig. 11 is a side elevational view of the magnet, its supporting arm and associated structure.

Fig. 12 is a top plan view of the bottom portion of the magnet swivel mount.

Fig. 13 is a top plan view of the top portion of the magnet swivel mount.

Figure 1:
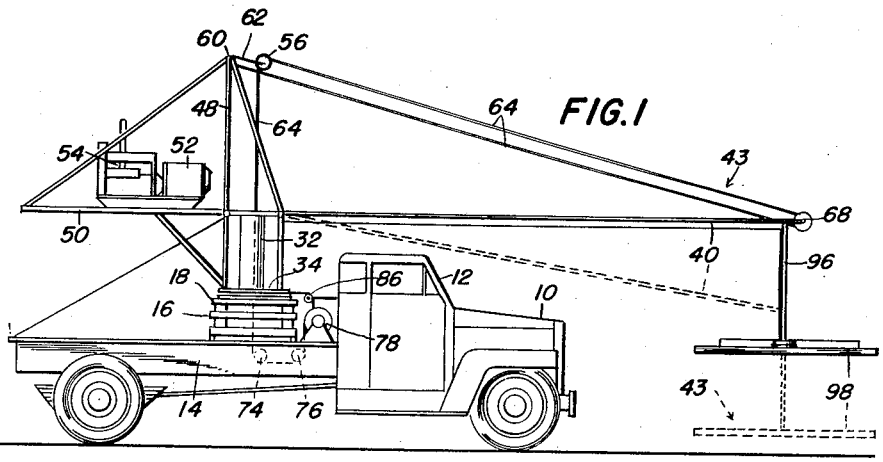
Fig. 1 is a side elevational view of a pick-up device embodying the present invention, the pick-up apparatus being mounted on a truck.

Referring now in greater detail to the drawings wherein similar reference characters refer to similar parts, there is shown a truck 10, of the conventional type having a driver's cab 12 and an open rear body 14. On the body 14 is provided a built-up platform 16 on which is fixed a circular base 18 of heavy cast iron or the like. This base may be of any desired dimensions depending on the vehicle upon which it is mounted and the type of work which it is intended to perform; preferably, however, it is about 6 feet in diameter when mounted on a conventional truck, as shown. The base 18 is fixed to the platform by any desired means, but is illustrated as being attached thereto by a plurality of bolts 20 extending through openings in base and platform. The base is provided with a plurality of rollers 22, mounted on the top surface thereof adjacent the periphery. A central opening 24 is provided in the base and a tube 26 extends upwardly from this opening.

A pair of thrust bearings 28 and 30 are provided around the bottom and top portions of the tube 26 and are mounted to radially support a coaxial tube 32 extending upwardly from a peripherally grooved table 34 surrounding a central opening in the table. The bottom surface of the table 34 rotatably rides on the rollers 22. Fixed to the top of the tube 32, as by tubular struts 36, is a rectangular frame 38 formed of four perpendicularly arranged bars.

To one of the bars of the frame 38 are pivotally connected a pair of bars 40 laterally spaced from each other and extending angularly toward each other as they extend toward a forward magnet-supporting position. Cross-braces 41 connect these bars 40 laterally to each other. The pivotal connection between the bars 40 and frame 38 is provided by a pair of swivel collars 42. These swivel collars are provided with sleeves 44 in which the bars 40 are removably connected as by means of bolts 46. The bars 40 form the magnet-holding boom 43.

A pair of spaced support bars 48 extend upwardly from the rear portion of frame 38, and also extending from the rear of the frame 38 is a supporting platform 50. This platform supports the motor 52 and generator 54 for supplying the current to the magnet hereinafter described. This platform, plus the motor and generator, also acts as a counterbalancing weight for the magnet and boom to which it is connected. The switch for actuating the motor and generator is placed in the cab of the truck. A pulley 56 is rotatably connected between the arms of a bracket 58 which is, in turn, attached to the cross-bar 60, of which one is shown supported on upright bars 48 although a series of them extending the height of the support bars 48 may be used. The connection to the cross bar 60 is through an arm 62. A cable 64, anchored at one end to the cross-bar 60, is drawn over a pulley 63 mounted between the arms of a bracket 70 fixed to the supports 72 which are, in turn, connected to the forward end of the boom 43 provided by the bars 40. The cable then extends over the pulley 56 and down through the hollow tube 26, over a pulley 74 which is mounted on the truck below the platform 16, over an adjacent pulley 76, and onto a winch 78. This winch 78 is of the double-drum type and is individually operated. It is powered by a power take-off from the truck and is operated by controls located in the truck cab. By means of this winch, the cable 64 is operated to raise the front end of the boom as indicated in Fig. 1, where the boom 43 is shown in raised position in full line and in lowered position in dotted outline.

In order to provide a rotational movement for the boom 43 a cable 80 is connected to a winch 82 and extends over a pair of idler pulleys 84 and 86 and around the peripheral groove 87 of table 34. The pulleys 84 and 86 are connected to the truck cab by means of respective arms 88 and 90 to which are connected the pulley-supporting brackets 92 and 94. The winch 82 is also of the double-drum type and individually operated by controls located in the truck cab. This winch has a flange large enough to accommodate two strands of cable and has only enough cable to rotate the table 34 a distance of 90° in each direction for a total of 180°. This limitation is provided in order to prevent unwinding of the cable or such tight winding as to cause damage to the apparatus. It also prevents fouling of the electric cable leading to the magnet. The various rotary positions of the boom are shown in dotted outline in Fig. 2.

Figure 2:
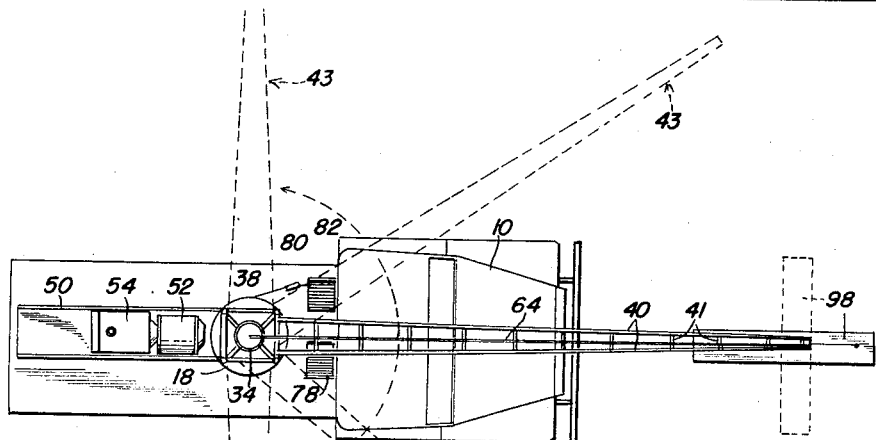
Fig. 2 is a top plan view of the device shown in Fig. 1.

Connected to the forward end of the boom 43, as by an adjustable arm 96, is an electro-magnet 98. This electro-magnet is connected to the generator and to the controlling switch in the truck cab by a cable 100. The arm 96 is vertically adjustable by means of the two telescoping parts 102 and 104, best illustrated in Fig. 11. Suitable means, such as a set-screw or the like, are used to maintain the telescoping parts in adjusted position. The electro-magnet 98, itself, which preferably comprises an elongated, rectangular bar, is pivotally adjustable into perpendicularly arranged position, shown in full and dotted outline in Fig. 2, by means of a swivel joint at the end of arm 96. This swivel joint comprises a circular plate 106 fixed to the upper surface of magnet 98, as by screws, bolts or pins, such as indicated at 108, and a circular plate 110 mounted for rotation on plate 106. The plate 110 is mounted on plate 106 by means of an upstanding annular flange or rib 112 on plate 106 which defines a central opening 114 through which the portion 104 of arm 96 extends. The plate 110 is fixed on the bottom of portion 104 and rotates within the annular groove formed by rib 112. Corresponding opening 116 and 118 are formed in plates 106 and 110 respectively and are adapted to receive a locking pin or the like, indicated at 120, when in coinciding positions. It should be noted that there are two openings 116 in plate 106, each offset 90° from the other. This is for the purpose of locking the magnet in its 90° offset positions, as indicated in Fig. 2.

The above description makes it clear that not only is the magnet of the present invention vertically adjustable, as by the pivotal adjustment of the forward end of the boom and by the axial adjustment of the magnet-supporting arm, but is also rotatably adjustable in an arc centering on the rear end of the boom as well as on a smaller arc centering on the swivel axis of the magnet. This permits not only large vertical and horizontal adjustments measured by the sweep of the boom but also small adjustments of the magnet into positions where it can enter into places not ordinarily accessible to previous types of road magnets. Although this invention has been described in considerable details, such description is intended as being illustrative rather than limiting since the invention may be variously embodied, and the scope of the invention is to be determined as claimed.

Having thus set forth and disclosed the nature of this invention, what is claimed is:

1. A magnetic road cleaning device comprising a base, a circular plate fixed to said base, a cylindrical rod extending upwardly from said base, a plate rotatable on said base, a tubular rod extending upwardly from said plate and surrounding said cylindrical rod in coaxial relationship thereto, thrust bearings between said coaxial rods, a boom mounted on said tubular rod for pivotal adjustment in a vertical plane, and a magnet adjustably mounted on said boom, said magnet being provided with a socket, a rod adjustably connected to said boom, a flange at the free end of said rod, said flange being rotatably positioned within said socket, and means to lock said flange in adjusted rotary position within said socket.

2. The device of claim 1 wherein said base is provided with a peripherally arranged series of rollers upon which said plate is rotatably supported.

3. The device of claim 1 wherein said plate is provided with a peripheral groove, a cable extending around said plate within said groove, and a winch connected to said cable.

4. The device of claim 1 wherein said magnet is an electro-magnet and wherein energizing means therefor are mounted on said boom in counterbalancing relationship to said magnet.

References Cited in the file of this patent

UNITED STATES PATENTS

| | | |
|---|---|---|
| 1,236,418 | Fogarty | Aug. 14, 1917 |
| 2,364,493 | Ulinski | Dec. 5, 1944 |
| 2,370,856 | Gray | Mar. 6, 1945 |
| 2,419,209 | Goodman | Apr. 22, 1947 |